(12) United States Patent
Girondi

(10) Patent No.: US 11,352,991 B2
(45) Date of Patent: Jun. 7, 2022

(54) WATER SEPARATION GROUP

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 0 days.

(21) Appl. No.: 16/647,444

(22) PCT Filed: Sep. 14, 2018

(86) PCT No.: PCT/IB2018/057053
§ 371 (c)(1),
(2) Date: Mar. 13, 2020

(87) PCT Pub. No.: WO2019/053647
PCT Pub. Date: Mar. 21, 2019

(65) Prior Publication Data
US 2020/0277920 A1    Sep. 3, 2020

(30) Foreign Application Priority Data

Sep. 15, 2017    (IT) .................. 102017000103354

(51) Int. Cl.
*B01D 29/21* (2006.01)
*F02M 37/24* (2019.01)
(Continued)

(52) U.S. Cl.
CPC ............ *F02M 37/24* (2019.01); *B01D 29/21* (2013.01); *B01D 29/52* (2013.01); *B01D 29/56* (2013.01);
(Continued)

(58) Field of Classification Search
CPC ........ B01D 29/21; B01D 29/52; B01D 29/56; B01D 36/001; B01D 36/005; B01D 2201/29; F02M 37/24
See application file for complete search history.

(56) References Cited

U.S. PATENT DOCUMENTS 9,194,343 B2    11/2015    Thienel
2012/0043267 A1    2/2012    Thienel

FOREIGN PATENT DOCUMENTS

DE    102005010423 A1 *  10/2005    ............. F02M 37/28
DE    10 2006 005 108 A1    8/2007
(Continued)

OTHER PUBLICATIONS

International Search Report and Written Opinion of the International Searching Authority for International Patent Application No. PCT/IB2018/057053 dated Nov. 30, 2018, 9 pages.

*Primary Examiner* — Waqaas Ali
(74) *Attorney, Agent, or Firm* — Merchant & Gould P.C.

(57) ABSTRACT

A water separation group is for a fuel filtration and separation assembly of a vehicle fuel circulation system. The assembly includes an assembly casing extending along a longitudinal axis positionable in the vehicle in a horizontal position and accommodating a filtration group for filtering dirty fuel. The water separation group is positionable in the assembly casing in fluidic connection with the filtration group and extends along a main axis parallel to and/or coincident with the longitudinal axis. The water separation group includes a separator and a blocking device below the separator to prevent return of separated water to the separator. The blocking device includes a blocking surface extending longitudinally forming an angle with the direction of the main axis that inclines at least a portion of the blocking surface to allow water separated from the fuel to flow towards the wall from which the blocking surface extends.

17 Claims, 9 Drawing Sheets

(51) Int. Cl.
  *B01D 29/52* (2006.01)
  *B01D 29/56* (2006.01)
  *B01D 36/00* (2006.01)
(52) U.S. Cl.
  CPC ......... *B01D 36/001* (2013.01); *B01D 36/005* (2013.01); *B01D 2201/29* (2013.01)

(56) References Cited

FOREIGN PATENT DOCUMENTS

| | | | | |
|---|---|---|---|---|
| DE | 102006005108 A1 * | 8/2007 | ............. | F02M 37/24 |
| DE | 10 2008 034 901 A1 | 1/2010 | | |
| EP | 0 858 825 A1 | 8/1998 | | |
| EP | 2 399 019 B1 | 4/2013 | | |
| EP | 2 857 669 A2 | 4/2015 | | |
| JP | 2009074495 A * | 4/2009 | ............. | F02M 37/32 |

\* cited by examiner

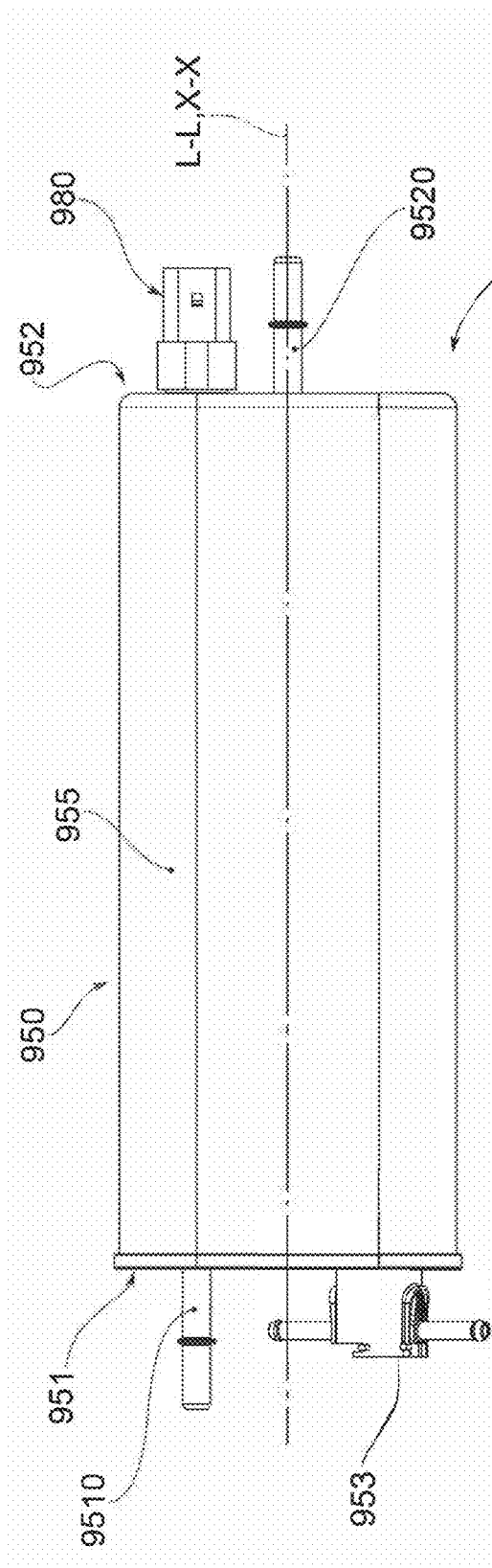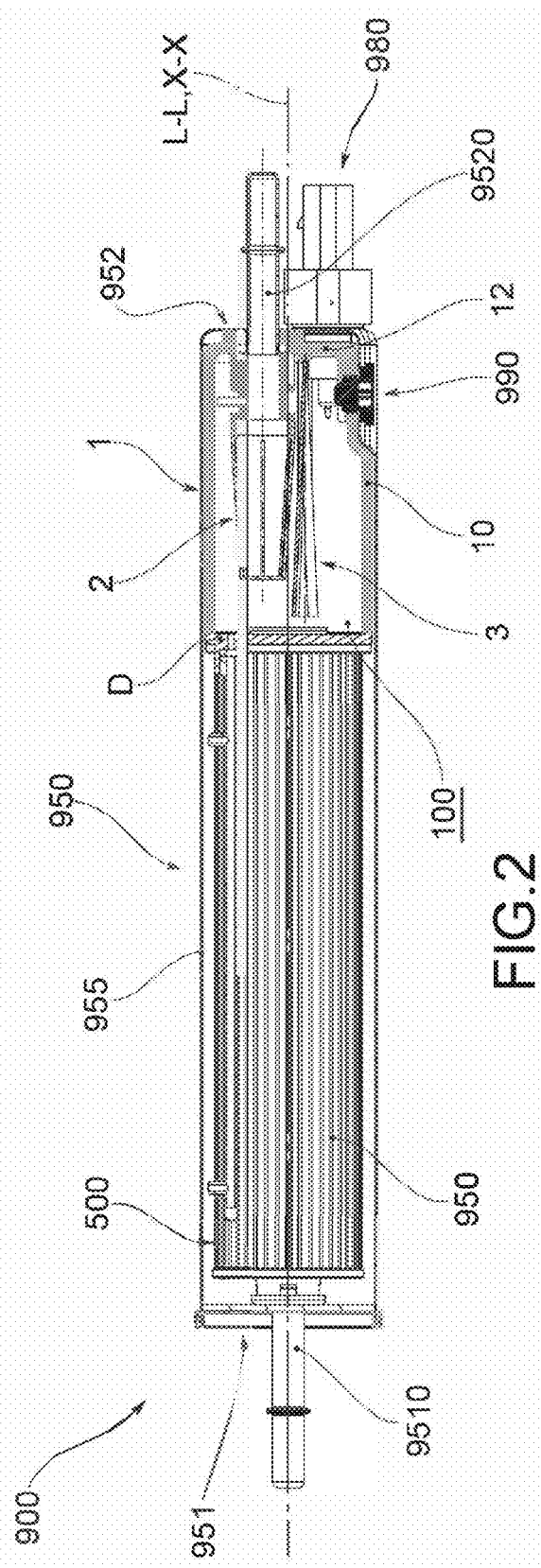

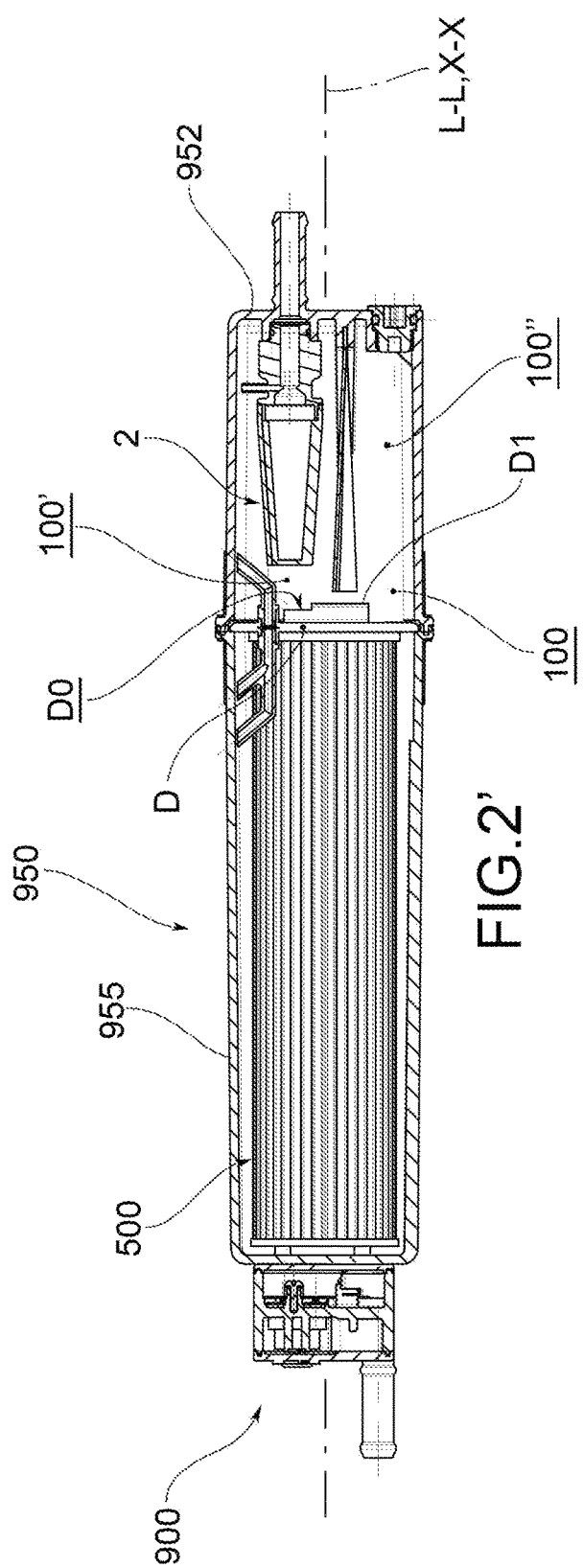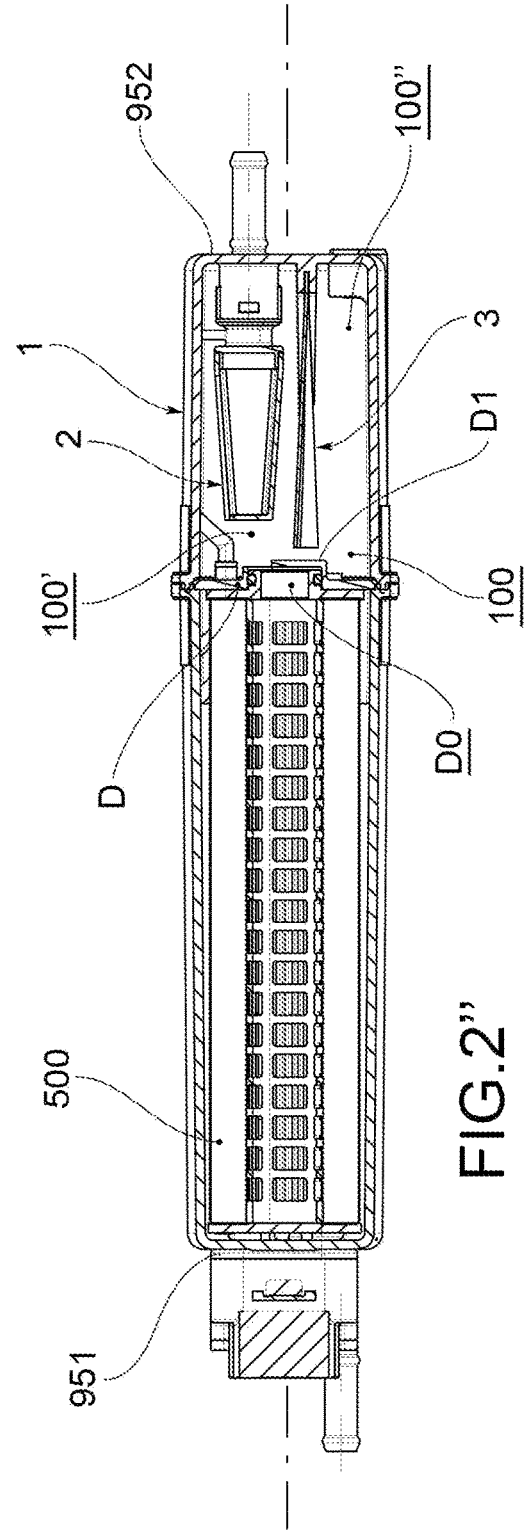
FIG.2'  FIG.2"

US 11,352,991 B2

WATER SEPARATION GROUP

This application is a National Stage Application of PCT/M2018/057053, filed 14 Sep. 2018, which claims benefit of Patent Application Serial No. 102017000103354, filed 15 Sep. 2017 in Italy and which applications are incorporated herein by reference. To the extent appropriate, a claim of priority is made to each of the above-disclosed applications.

FIELD OF APPLICATION

The present invention relates to a water separation group for a fuel filtration and separation assembly of a fuel circulation system of a vehicle and to a fuel filtration and separation assembly comprising said water separation group.

The present invention falls within the automotive field. Specifically, it relates to fuel filtration and separation assemblies, preferably of diesel type, which are placed upstream of the combustion chamber of the internal combustion engine. In other words, the fuel in output from such filtration and separation assemblies flows in the fuel circulation system towards the engine group.

In particular, these assemblies have a dual function: they have the purpose of filtering the fuel to remove any suspended particles and/or impurities therefrom that could damage the components of the fuel circulation system downstream, such as the engine group or the high-pressure pump; they have the purpose of separating any water particles in the fuel that could damage the components of the fuel circulation system downstream, such as the injectors and/or that could cause non-optimal combustion.

A plurality of fuel filtration and separation assemblies are known in the prior art having said dual functionality.

In particular, fuel filtration and separation assemblies are known, having a vertical extension, that is, adapted to be installed in the vehicle and to operate in a substantially vertical position. Such assemblies have in the upper portion thereof filtration and/or separation groups adapted to perform the respective actions on the fuel and in the lower portion thereof a water collection chamber, wherein the water separated from the fuel accumulates by the action of the force of gravity.

An embodiment showing this type of fuel filtration and separation assemblies is shown in document EP0858825.

However, in the vehicle there is not always the possibility of having the fuel filtration and separation assembly in a vertical position.

For this reason, embodiments of fuel filtration and separation assemblies are also known, having a horizontal extension, that is, adapted to be installed in the vehicle and to operate in a substantially horizontal position.

However, such fuel filtration and separation assemblies with horizontal extension have significant technical drawbacks.

The known assemblies, in fact, perform a separation of water from fuel that is not very effective, but above all they exhibit great difficulty in collecting the water.

For these reasons, the known water filtration and separation assemblies have particularly complex and cumbersome geometries. Embodiments of a fuel filtration and separation assembly are in fact known wherein a water collection chamber is provided in a lower position with respect to the filtration devices. In other words, while the known embodiments operate with the fuel in a horizontal direction, they have an at least partially vertical extension for providing a water collection chamber at the bottom.

Embodiments of fuel filtration and separation assemblies with horizontal extension according to such a description are shown in documents EP2399019 and DE102006005108.

Solution of the Invention

The need to provide a water separation group for fuel separation and filtration assemblies with horizontal development wherein the above-mentioned problems are resolved is therefore strongly felt. Likewise, the need to provide a fuel separation and filtration assembly which comprises such a water separation group is strongly felt.

The object of the present invention is indeed to provide a water separation group with horizontal extension wherein the separation operations are carried out in an effective and efficient manner, but above all, that has a simple and compact geometry wherein the vertical dimensions are limited as much as possible.

DESCRIPTION OF THE DRAWINGS

Further features and advantages of the invention will be made apparent from the following description of preferred embodiment examples thereof, provided purely by way of a non-limiting example, with reference to the accompanying figures, wherein:

FIG. 1 shows a top view of the fuel filtration and separation assembly object of the present invention, according to a preferred embodiment;

FIG. 2 shows a side longitudinal sectional view of the fuel filtration and separation assembly shown in FIG. 1, according to a first embodiment;

FIGS. 2' and 2" illustrate two side views along two longitudinal sectional planes of a fuel filtration and separation assembly according to a variant embodiment;

DETAILED DESCRIPTION

Figure 3:
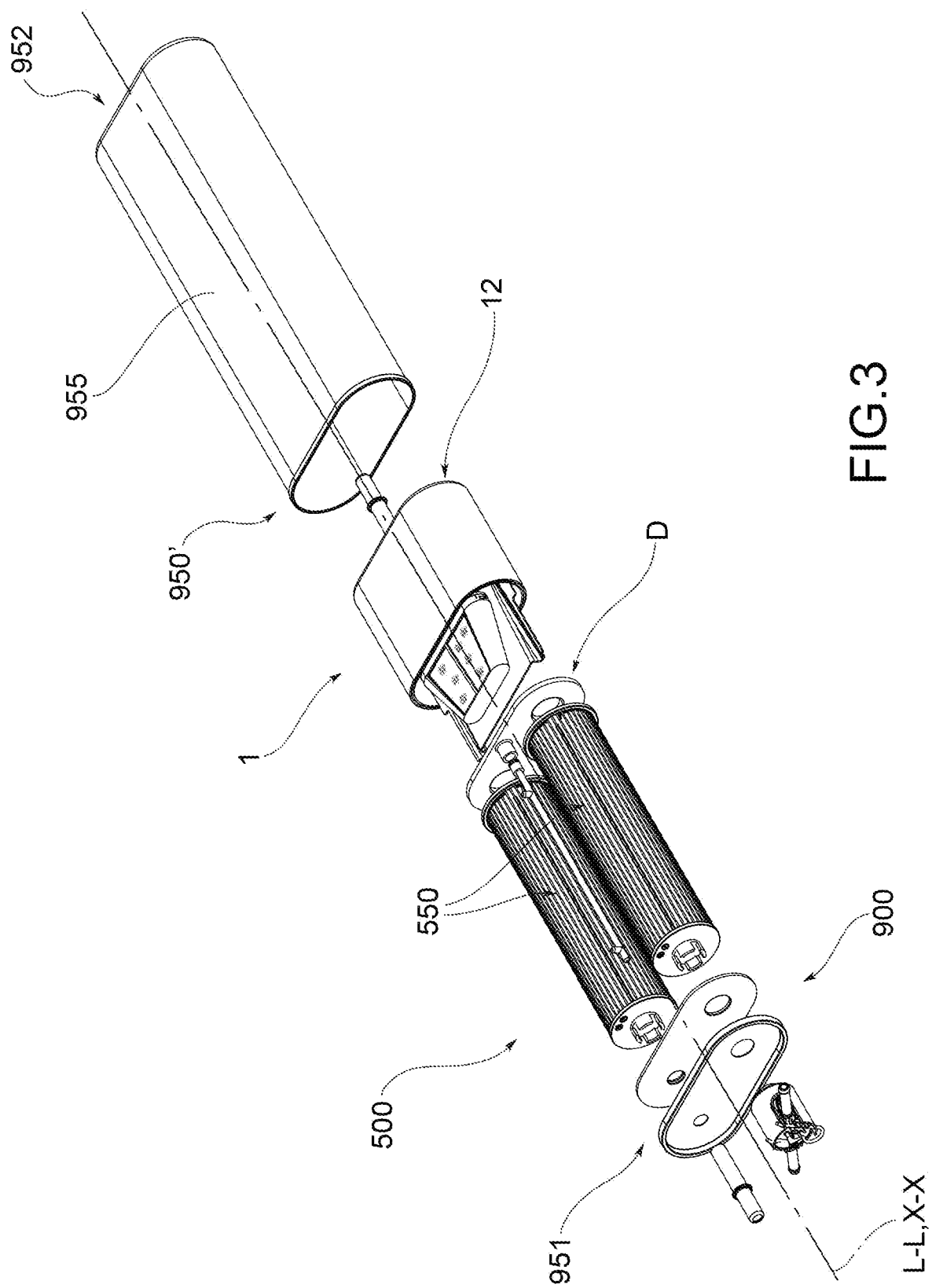
FIG. 3 shows a perspective sectional view with separate parts of the fuel filtration and separation assembly shown in FIG. 1.
Figure 3A:
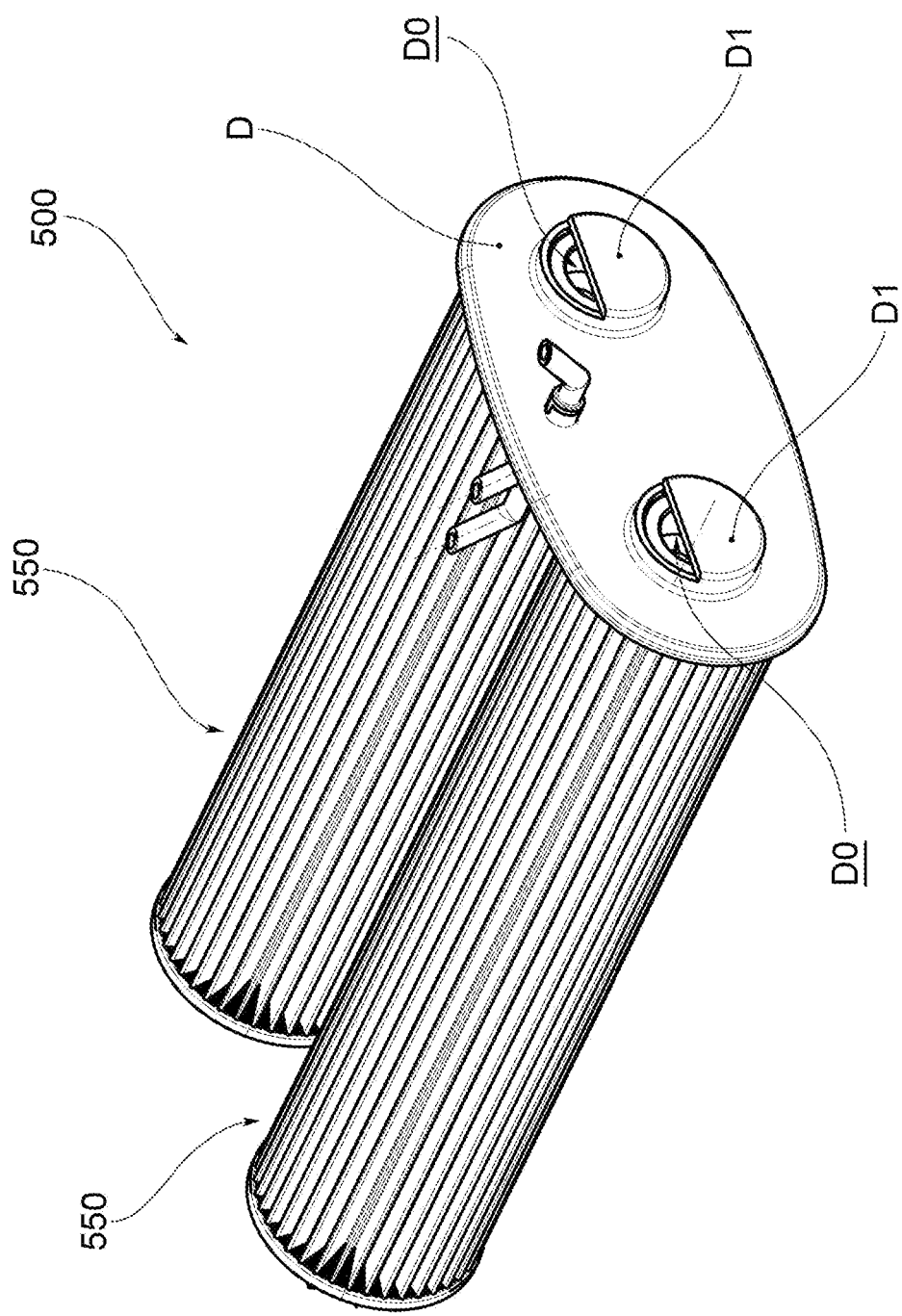
FIG. 3a shows a perspective view of a filtration group comprised in the filtration and separation assembly of FIGS. 2' and 2"
Figure 4:
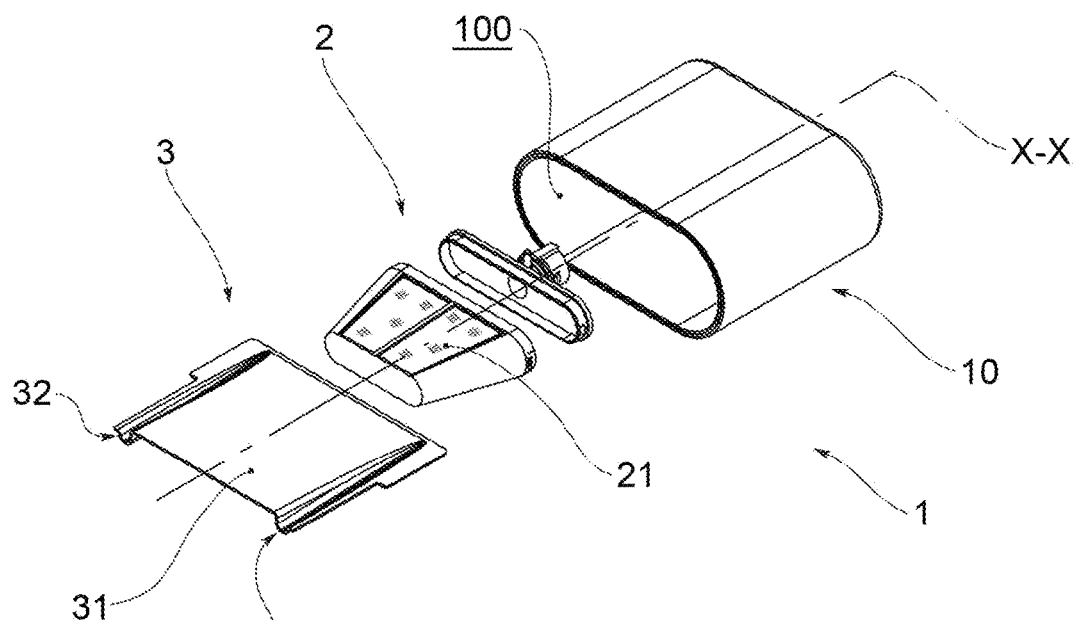
FIG. 4 shows a perspective sectional view with separate parts of a separation group object of the present invention, according to a preferred embodiment herein comprised in the filtration and separation assembly shown in FIGS. 1 to 3.
Figure 5B:
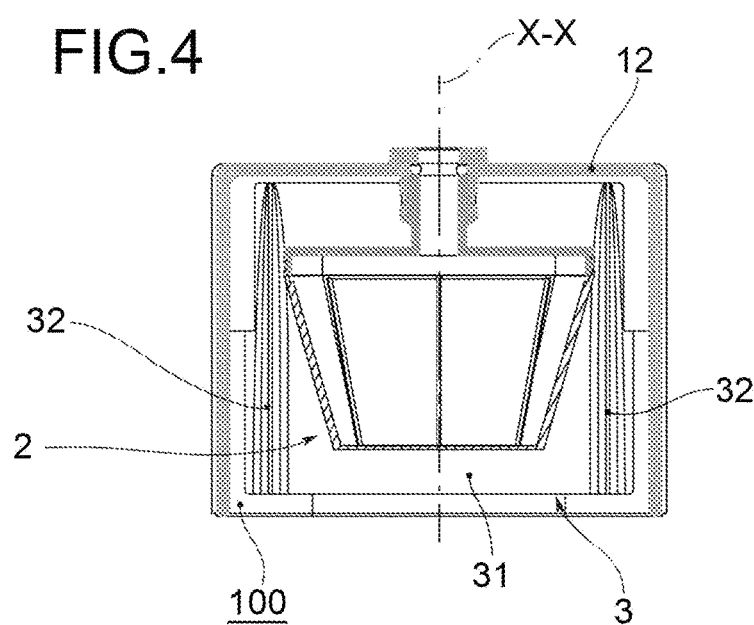
FIGS. 5a and 5b show the separation group of FIG. 4 in a front view and a top sectional view, respectively.
Figure 5A:
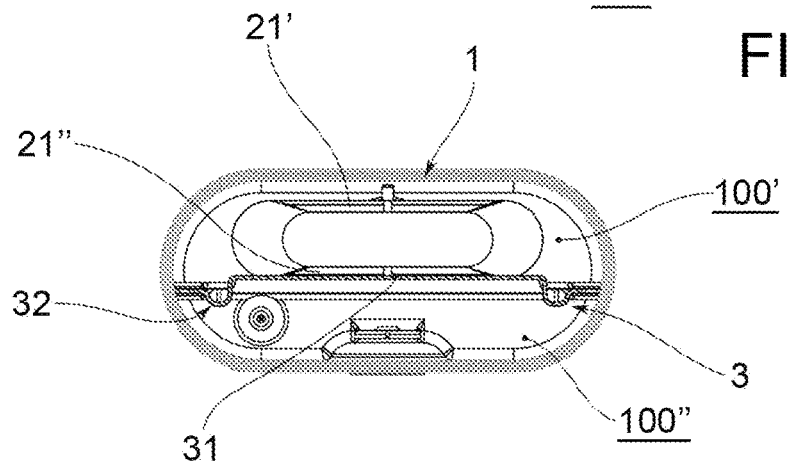
Figure 6A:
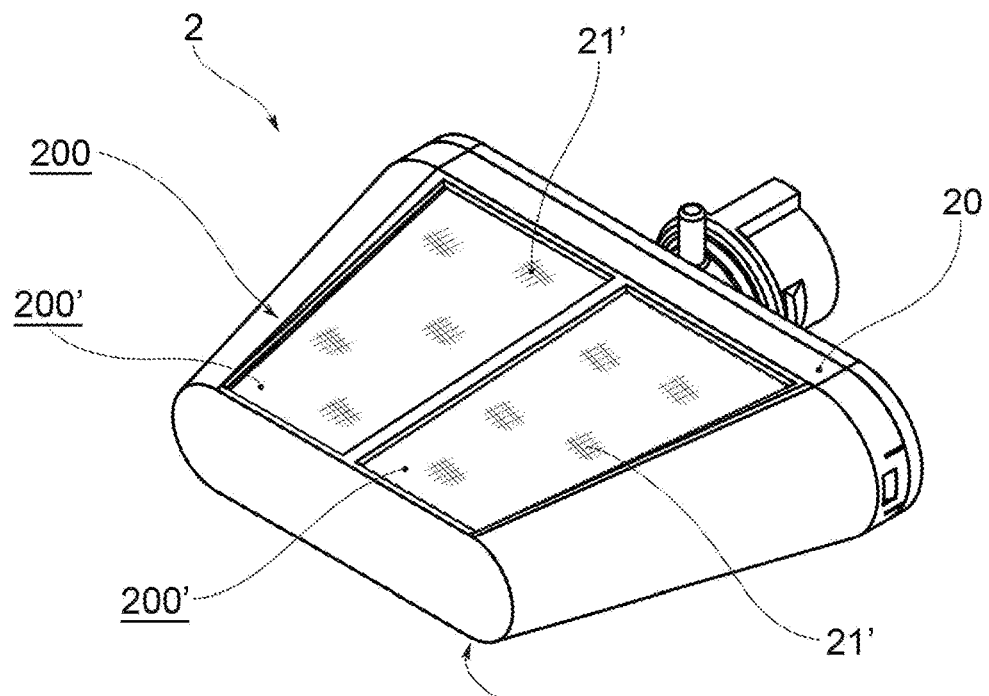
FIGS. 6a, 6b, 6c and 6d show a separator device of a separation group such as that in FIG. 4, in a perspective view, a top view, a front view and a side view, respectively.
Figure 6B:
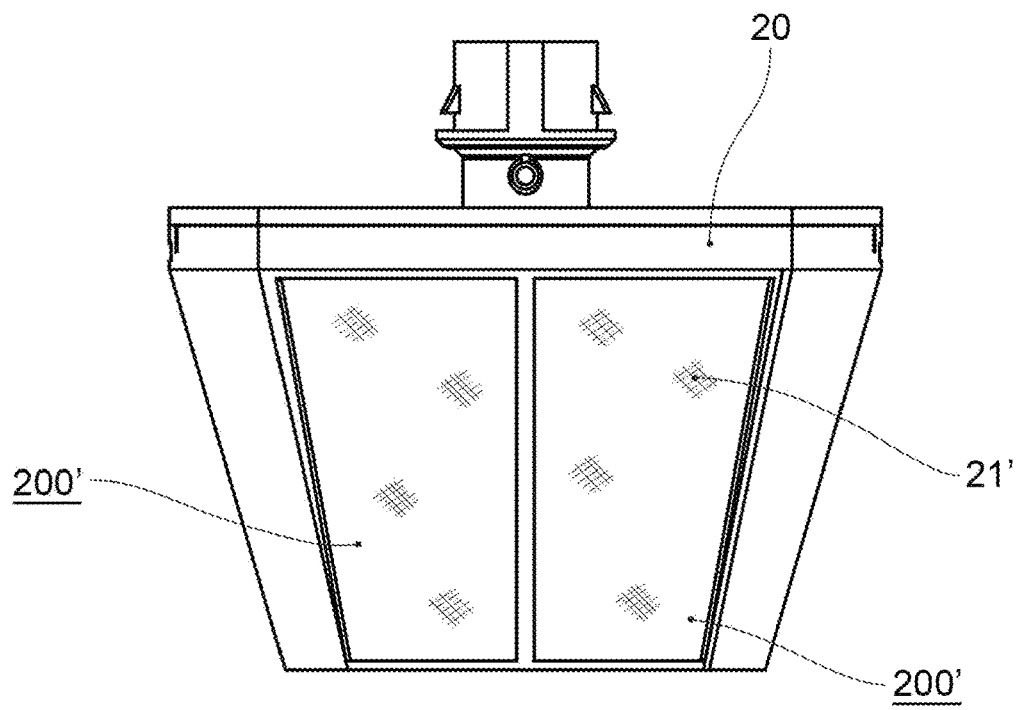
Figure 6C:
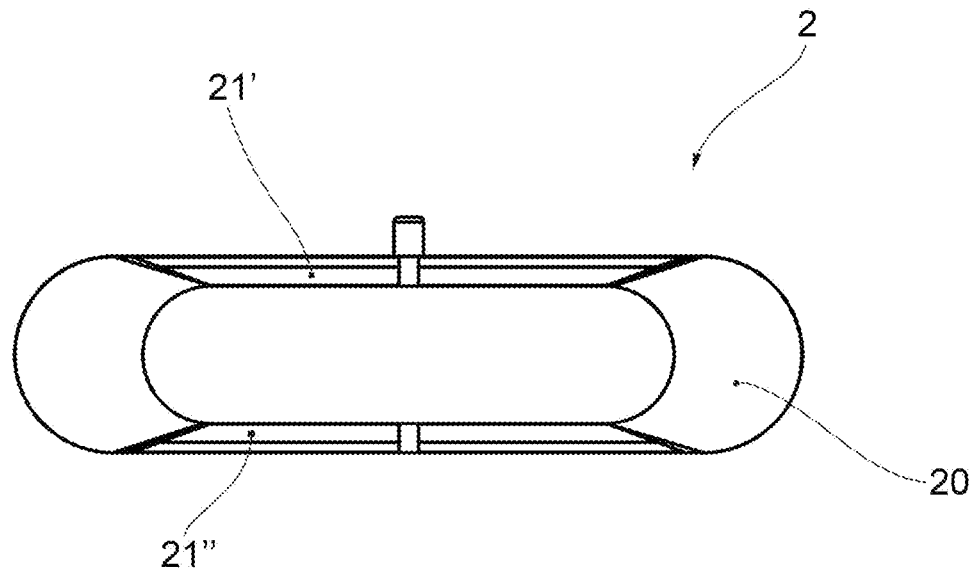
Figure 6D:
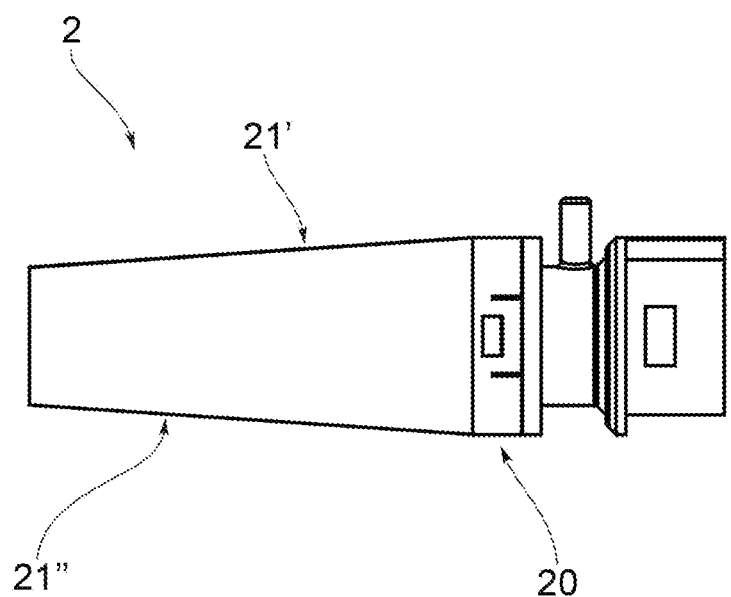
Figure 7A:
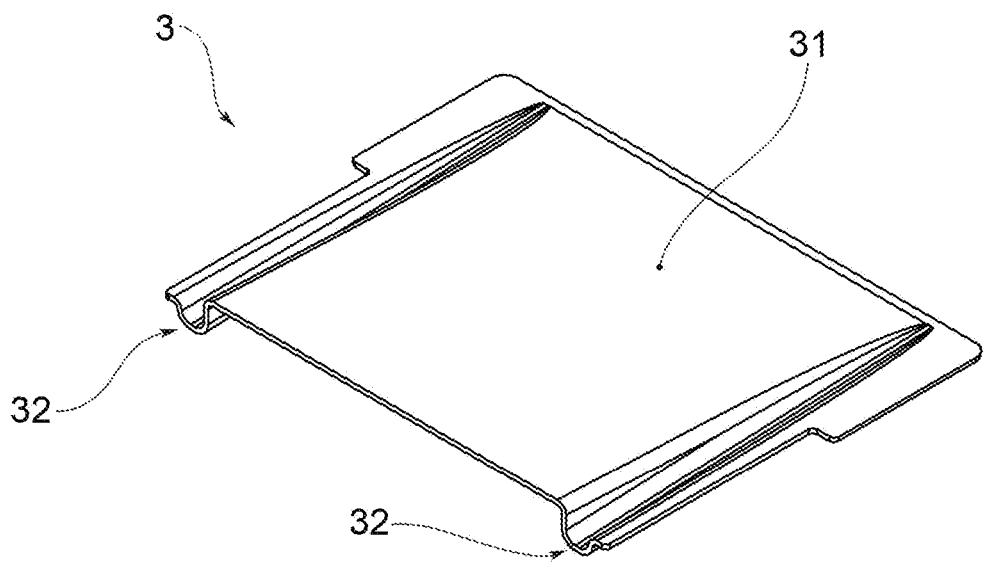
FIGS. 7a, 7b, 7c and 7d show a blocking device of a separation group such as that in FIG. 4, in a perspective view, a top view, a front view and a side view, respectively.
Figure 7B:
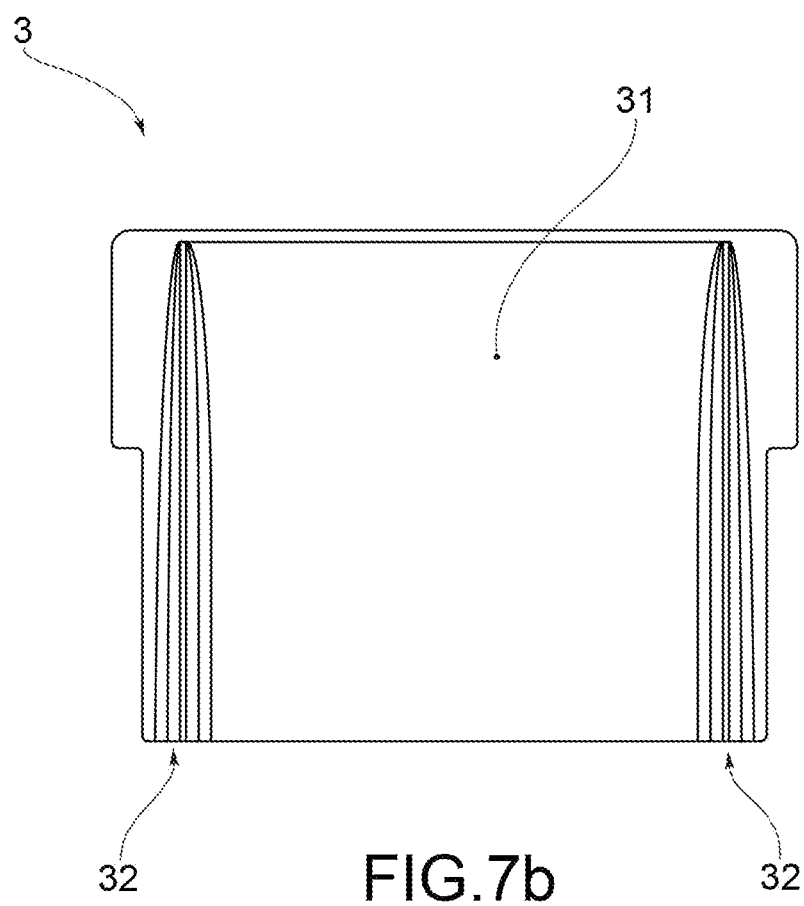
Figure 7C:
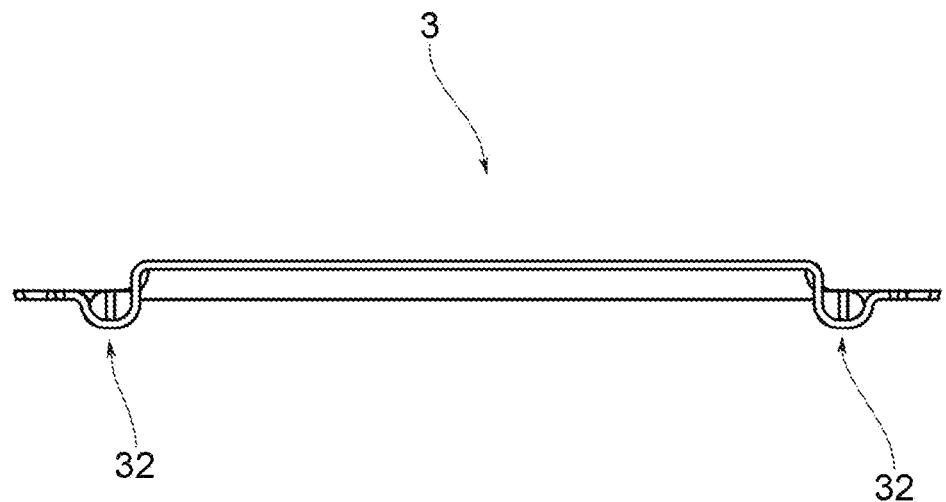
Figure 7D:
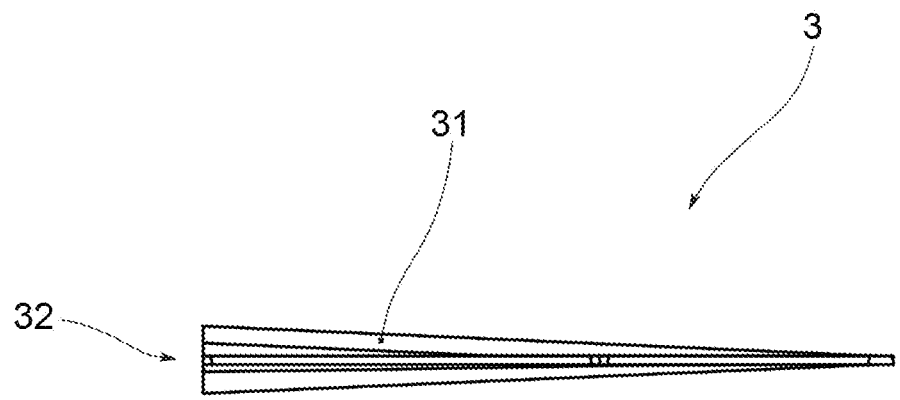

In the accompanying figures, reference numeral 1 denotes a water separation group according to the present invention, according to a preferred embodiment.

Such a water separation group 1 is specific for a fuel filtration and separation assembly 900 of a fuel circulation system of a vehicle. The fuel filtration and separation assembly 900 which comprises said water separation group 1 is also in turn object of the present invention.

Both the separation group 1 and assembly 900 fall within the context described above, operating in a horizontal configuration, i.e. being housed in the vehicle in a substantially horizontal position; where "horizontal position" means that these components operate in the vehicle, fluidically connected with the fuel circulation system, in a position substantially parallel to the ground plane along which the vehicle moves. Other references to areas, portions and/or components of the water separator group and of the fuel filtration and separation assembly that are "lower", "upper", "side" are to be considered as a function of said horizontal positioning thereof in the vehicle.

In particular, the assembly 900 extends along a longitudinal axis L-L the position of which, with the assembly mounted in the vehicle, is substantially horizontal.

According to the present invention, the fuel filtration and separation assembly 900 performs a dual action on the fuel circulating in the circuit: in effect, as widely described below and also shown in the accompanying figures, the fuel filtration and separation assembly 900 is adapted to perform a filtering action on the dirty fuel to filter it from suspended particles and impurities and also is adapted to perform a separation action on the filtered fuel to separate it from water.

For these reasons, the assembly 900 comprises, in addition to the water separation group 1, specifically adapted to perform the operations of separation of water from fuel, a filtration group 500 which is instead specific for the filtration of dirty fuel from suspended solid particles and impurities.

That is to say, firstly, the dirty fuel intercepts the filtration group 500 where it is filtered from impurities, and secondly, the filtered fuel intercepts the water separation group 1 where it is separated from water, in such a way that the clean fuel flows downstream of the assembly 900. According to a preferred embodiment, the filtration group 500 is also adapted to perform an action of coalescence of water emulsified in the fuel in the form of small droplets, typically less than 100 microns in diameter (typically less than 50 microns in diameter) in such a manner that they are aggregated to form water particles of a size larger than 200 microns (preferably even up to 2 mm) or in any case larger than the drops of water entering the filtration group 500, so that the water separation group may operate on aggregated water particles.

In particular, the water separation group 1 is fluidically connected to the filtration group 500 being mutually positionable in a serial manner along the longitudinal axis L-L. In other words, the assembly 900 along the longitudinal axis L-L first has the filtration group 500 and then the water separation group 1.

According to the present invention, the assembly 900 comprises an assembly casing 950 extending along said longitudinal axis L-L wherein said filtration group 500 is housed and wherein the separation group 1 is housed.

The assembly casing 950 is, in effect, fluidically connected with the fuel circulation system comprising an inlet wall 951 comprising at least one inlet mouth 9510 and an outlet wall 952 comprising at least one outlet mouth 9520.

According to a preferred embodiment, the assembly casing 950 has an elongated shape between the inlet wall 951 and the outlet wall 952, substantially constant having side walls 955 substantially parallel to the longitudinal axis L-L. In other words, the assembly casing 950 has a substantially prismatic shape, i.e. characterized in that the inlet wall 951 and the outlet wall 952 have the same dimensions.

Preferably, an assembly housing 950' is identified, constituted of the outlet wall 952 and of the side walls 955, to which the inlet wall 951 is fixable to close it and to define the inner space thereof wherein the filtration group 500 and the separation group 1 are housable.

That is to say, the assembly 900 is longitudinally composable in a modular manner, in such a way that each group comprised therein performs specific operations on the fuel, such as filtration operations or separation operations. In particular, preferably, the two groups comprised in the assembly 900 therefore are insertable in the casing 950, respectively, in a modular manner.

The present invention is not limited to the shape and dimensions of the filtration group 500. However, as shown in the accompanying figures, the dimensions of the filtration group 500 are such as to affect the shape (and in particular the section) of the assembly 900.

According to a preferred embodiment, the fuel filtration group 500 comprises at least one tubular insert 550 which extends along the longitudinal axis L-L, traversable in a radial manner by the fuel, preferably from the outside to the inside. In a preferred embodiment, the fuel filtration assembly 500 comprises a plurality of tubular inserts 550 (in a preferred embodiment two tubular inserts), each of which extends along the longitudinal axis L-L.

According to a preferred embodiment, the filtration group 500 and the separation group 1 housed in the assembly casing 950 are separated by a partition wall D.

Preferably, the partition wall D is comprised in the casing 950.

Preferably, the partition wall D is comprised in the separation group 1.

Preferably, the partition wall D is comprised in the filtration group 500. Preferably, each filtration insert 550 is operatively connected to an end on said partition wall D. Preferably, each filtration insert 550 is also fluidically connected to said partition wall D in such a way that the clean side of each filtration insert is in fluid communication with the separation chamber, in particular with the dirty side of the separation device 2.

Preferably, inside the assembly casing 950, at the two sides of the partition wall D are defined a first chamber or filtration chamber accommodating the filtration group 500 and a second chamber or separation chamber accommodating the water separation group 1.

According to the present invention, the water separation group 1 comprises a main body 10 which extends along a main axis X-X.

In a configuration wherein the separation group 1 is mounted in the vehicle, the main axis X-X and the longitudinal axis L-L are substantially parallel and/or coincident. That is to say, said main body 10, in turn, has a substantially longitudinal extension.

According to a preferred embodiment, the water separation group 1 is adapted to define a water separation chamber 100 inside the assembly casing 950 such as that chamber wherein the water-fuel separation operations are performed.

Moreover, the water separation group 1 according to the present invention comprises a separator device 2 housed in the separation chamber 100 fluidically connected with the outlet mouth 9520 adapted to perform the separation operations.

Said separator device 2 extends in the longitudinal direction starting from said outlet wall 952.

According to the present invention, the separator device 2 comprises a bearing structure 20 traversable by fuel, identifying a dirty side, wherein filtered fuel coming from the filtration group flows, and a clean side (fluidically connected with the outlet mouth 9520) from which clean fuel separated from water flows.

The bearing structure 20 is in effect preferably hollow.

The bearing structure 20 comprises at least one passage opening 200 through which the fuel flows. Preferably, on said opening the separator device 2 comprises a separation surface 21 constituted of a hydrophobic filtration means transverse to said passage opening 200.

According to a preferred embodiment, such a bearing structure 20 is fixable or is fixed to the outlet wall 952 in such a way as to have the inner side, clean, fluidically connected with the outlet mouth 9520.

Preferably, as also shown in the accompanying figures, on said bearing structure 20 according to a preferred embodiment, each passage opening 200 is divided into a plurality of passage sub-openings 200' planarly aligned with each other. Preferably, therefore, the separation surface 21 extends planarly on a plurality of auxiliary openings.

According to a preferred embodiment, moreover, the separator device 2 has predominant extension in the longitudinal direction with respect to the vertical direction.

According to a preferred embodiment, such separation surfaces 21 are arranged with respect to the direction of the main axis X-X inclined in such a way as to converge moving away from the outlet wall 952. Preferably, the bearing structure 20 has a shape such that the separation surfaces 21 arranged thereon have such a converging shape.

According to a preferred embodiment, the separator device 2 comprises an upper separation surface 21' and a lower separation surface 21". In other words, according to a preferred embodiment, two separation surfaces are substantially identified which extend longitudinally.

Preferably, the bearing structure 20 has respective upper and lower passage openings 200 (according to what described and represented by way of example in the figures, each passage opening has a plurality of passage sub-openings 200').

According to a further preferred embodiment, the separator device 2 comprises a separation surface 21 oriented orthogonally with respect to the longitudinal axis L-L.

Preferably, said separation surface is vertically oriented. According to a preferred embodiment, said separation surface 21 is provided on the bottom wall of the bearing structure 20, oriented transversely to the longitudinal axis L-L and axially spaced from the outlet wall 12.

According to a preferred embodiment, the separation surfaces 21 consist of a hydrophobic filtration means adapted to promote the separation of water when traversed by the fuel.

Preferably, said hydrophobic filtration means is made in the form of non-woven fabric of synthetic fibers (such as PA, PET, PBT, polyester, viscose) or in the form of fabric (PA, PET or PBT), for example treated with silicone or PTFE or plasma, such as to have a static water contact angle greater than 90°, making it non-wettable to water, and being therefore adapted to perform a "barrier" effect to water, being instead fuel-permeable.

According to a preferred embodiment, the separator device comprises a single filtration means fixed to the bearing structure: at each plane and at each separation surface arranged thereon are identified the respective separation surfaces 21.

According to the foregoing, the separation device 2 preferably has a tapered shape, moving longitudinally away from the outlet wall 952. In a vertical longitudinal section, the separation device 2 (and in particular the bearing structure 20) has a shape that is substantially triangular or trapezoidal, having the upper separation surface 21' and the lower separation surface 21" at the two opposite longitudinal sides.

According to the present invention, the water separation group 1 further comprises a blocking device 3, in turn housed in the separation chamber.

In particular, the blocking device 3 is positioned below the separator device 2, thereby dividing the separation chamber 100 into an upper region 100' wherein the separator device 2 is housed, and a lower region 100" wherein the water separated from the fuel is collected.

The blocking device 3 is therefore adapted to prevent the return of water into the upper region 100'.

In particular, the blocking device 3 comprises a drainage region arranged in the vicinity of the outlet wall and positioned below the outlet mouth 9520 in order to facilitate the drainage of the separated water towards the lower region 100". In addition, such a blocking device 3 has openings and/or sliding surfaces provided to ensure the drainage of the separated water towards the collection region while minimizing the accumulation of water in the vicinity of the outlet mouth.

According to a preferred embodiment, the blocking device 3 comprises a blocking surface 31 which extends from the outlet wall 952 in a longitudinal direction.

According to a variant embodiment, the blocking device 3 comprises a blocking surface 31 which extends from the partition wall D or integrally mountable to said partition wall D. Preferably, the blocking device 3 is integrally formed with the partition wall D.

According to the present invention, said blocking surface 31 forms an angle with the direction of the main axis X-X that inclines at least a portion of said blocking surface 31 so as to allow the water separated from the fuel to flow towards said outlet wall 952.

In a preferred embodiment, the blocking surface 31 extends in a substantially planar manner.

According to a preferred embodiment, said inclined portion of the blocking surface 31 is inclined, forming an angle with the main axis X-X substantially equal to the inclined angle according to which the separation surfaces 21 extend. In other words, the blocking surface 31 is substantially parallel to the separation surface 21 proximal thereto, namely the lower separation surface 21".

The blocking surface 31 is shaped in such a way as to delimit the water collection region 100" in a shape such as to have a greater height distancing itself longitudinally from the outlet wall 952, i.e. approaching the inlet wall 951.

According to a preferred embodiment, the blocking device 3 comprises at least one drainage channel 32 which extends in a longitudinal direction forming an opposite angle with respect to the angle formed by the blocking surface 31.

Preferably, the water separated by the separation device 2 flows from the upper region 100' to the lower region 100" in a double slide direction. The water separated by the separation device 2 by the action of the force of gravity tends to initially flow towards the outlet wall 952, flowing on the blocking surface 31, and then towards the inlet wall 951, flowing into the drainage channel 32, to then flow into the collection chamber 100".

In a preferred embodiment, the blocking device 3 comprises two drainage channels 32 arranged at the side edges of the blocking surface 31.

Preferably, the blocking surface 31 and the drainage channels 32 comprise connecting portions adapted to facilitate the above flow of water.

According to a preferred embodiment, the blocking device 3 comprises at least one passage opening adapted to put the separation region 100' in fluid communication with the collection region 100".

According to a preferred embodiment, such a passage opening is provided to allow the drainage of the water blocked by the separator device 2 towards the collection region 100". Preferably, such a passage opening is sized and positioned on said blocking device 3 in such a way as to minimize the return of water towards the separation region 100'. Preferably, such a passage opening is provided at the side edges of the blocking surface 31.

According to a preferred embodiment, the blocking device 3 comprises a fuel inlet channel adapted to convey the filtered fuel coming from the filtration group 500 towards the separation device 2.

For example, the fuel inlet channel extends longitudinally with a different inclination, preferably opposite, to the inclination at which the blocking surface 31 is inclined.

According to a preferred embodiment, the above-described water separation group 1 is adapted to be inserted into the assembly casing 950, in particular the water separation device 2 and the blocking device 3 are adapted to be integrally connected with the outlet wall 952.

In further preferred embodiments, the water separation group 1 is adapted to be inserted into the assembly casing 950 as a cartridge.

In particular, in effect, the water separation group 1 comprises a main body 10 which extends along the main axis X-X and delimits therein the separation chamber 100 comprising a bottom wall 12 fluidically connected with the outlet wall 952 and the at least one outlet mouth 9520.

According to this embodiment, all the features described above referring to the bottom wall 952 may similarly refer to said bottom wall 12.

Such a main body 10 supports the separation device 2 and the blocking device 3, on the bottom wall 12 thereof, the latter fluidically connected with the outlet wall 952 of the casing 950.

Preferably, the main body 10 has a geometric shape complementary to the casing 950, so as to be insertable therein in the longitudinal direction.

Preferably, the main body 10 has at its opposite axial end with respect to the bottom wall 12 an opening through which the filtered fuel coming from the filtration group 500 flows, in particular from the clean side of the filtering inserts. Preferably, on said opening rests the partition wall D, which is provided with transverse holes adapted to allow the passage of filtered fuel.

According to the foregoing and as shown in the accompanying figures by way of example, the water separation group 1 has a substantially elongated extension.

According to a preferred embodiment, the water separation group 1 preferably extends in a lateral direction. In other words, in a preferred embodiment, the water separation group 1 preferably extends in a lateral direction, substantially parallel to the horizontal ground plane on which the vehicle moves: in particular, the water separation group 1 has a width substantially equal to the width of the assembly casing 950.

According to a preferred embodiment, in the lower portion thereof, the water separation group 1 is purgeable through a dedicated purge hole, preferably extending through the casing 950 and possibly the main body 10 (when present). Preferably, such a purge hole is closed by a suitable plug 990. In other words, by means of the purge hole the water collected in the lower region 100" is purgeable in case of need.

Moreover, again according to a preferred embodiment, the filtration and separation assembly 900 also comprises a water level sensor 980 adapted to detect the amount of water collected in the separation chamber 100 and in particular in the lower region 100".

In addition, further embodiments of the filtration and separation assembly 1 object of the present invention are also possible. For example, according to a preferred embodiment, shown in FIGS. 2', 2" and 3a, the partition wall D comprises at least one through hole D0 suitable for fluidically connecting the first chamber and the second chamber. Preferably, at each filtration insert 550, the partition wall D comprises a respective through hole D0, in such a way as to fluidically connect the clean side of the filtration group 500, i.e. of the filtration insert, with the water separation chamber 100.

According to a preferred embodiment, the partition wall D at the D0 comprises a protective shield D1 suitable to oppose a possible return of the separated water present in the separation chamber 100. In particular, in effect, the protective shield D1 is firstly suitable for directing the fuel filtered by the filtration group 500 towards the upper region 100' of the separation chamber 100, and secondly it is suitable to prevent the water separated from the fuel and accumulated in the lower region 100" from being able to return to the filtration chamber. According to a preferred embodiment, the protective shield D1 extends up to a height greater than the height wherein the locking device 3 is positioned, directing the filtered fuel (coming from the filtration chamber 500) towards the upper region 100' and towards the separation device 2 and facilitating the fuel-water separation operations. According to a preferred embodiment, the risk that the filtered fuel coming from the filtration chamber 500 mixes with the free water collected in the lower region 100" is reduced by means of the partition wall D. In this way, the risk of any portions of water mixing with the fuel in the form of fine drops (for example less than 200 microns) and being transported downstream of the separation device 2 is reduced.

According to the foregoing, the method of assembling a fuel filtration and separation assembly 900 comprises the steps of:
  having an assembly housing 950' which extends along the longitudinal axis L-L comprising side walls 955 and an outlet wall 952 having an outlet mouth 9520;
    inserting the separation group 1 in the assembly housing 950' so as to fluidically connect it with the outlet mouth 9520;
    inserting the filtration group 500 in the assembly housing 950';
    obtaining the assembly casing 950 closing the assembly housing 950' with the inlet wall 951 in such a way as to fluidically connect the filtration group 500 with the inlet mouth 9510.

Innovatively, the water separation group and the filtration and separation assembly comprising the same amply meet the object of the present invention overcoming the typical drawbacks of the prior art.

Advantageously, in fact, the water separation group, while being specifically adapted to operate and to be positioned in the vehicle in a horizontal position, performs effective water-fuel separation operations.

Advantageously, the water separation group is adapted to operate effectively with both the fuel circulated in pressure thrust and with the fuel in suction circulation.

Advantageously, the separation device has separation surfaces which have a predominant longitudinal extension and are adapted to process high fuel flow rates. In other words, advantageously, the separation device is adapted to have a large treatment surface.

Advantageously, thanks to the large filtration surface provided by a separator device having a conical, trapezoidal or, in general, tapered shape, the separator device is adapted to perform the fuel-water separation operations by minimizing the pressure drops in the fuel supply circuit.

Advantageously, moreover, the separation group has the respective components with a shape adapted to promote the accumulation of water in a lower region.

Advantageously, the inclined walls of the separation device are adapted to facilitate, in addition to the collection of water, a rapid descent thereof.

Advantageously, the blocking device is structured to facilitate the water descent by means of the double slide. At the same time, the blocking device is structured to prevent the accumulated water from returning to the separation device.

Advantageously, the water collected in the collection region is prevented from returning into the separation region even when the vehicle is going uphill or downhill and/or when the vehicle brakes suddenly.

Advantageously, the blocking device is adapted to divide the separation chamber having a water accumulation region of the largest possible size, optimized for the manufacturer's needs.

Advantageously, the blocking device is positioned in the vicinity of the separation device defining a collection region that extends in height moving away from the outlet walls.

Advantageously, the blocking device is configured to increase the extension of the collection chamber and at the same time minimize the risk that any water droplets reach the separation region from the collection region when the amount of water accumulated in the same collection region is close to or above the threshold level defined by the water level sensor.

Advantageously, the water separation group does not require a water collection chamber with a vertical extension or which extends in a lower position with respect to the filtration group.

Advantageously, the separator device may be manufactured with simple operations, for example, it may be manufactured by molding, for example in such a manner that the hydrophobic filtration means is co-molded with the bearing structure.

Advantageously, the blocking device is obtainable through simple molding operations to be formed integrally with the inlet wall or with the outlet wall or, in general, with the side walls of the main body of the water separation group.

Advantageously, the blocking device comprises an inclined blocking surface which allows the machining of the workpiece to be facilitated by means of molding and the extraction of the main body or the outlet wall to be facilitated if the blocking device is formed integrally with these components.

Advantageously, the water separation group is optimized to perform efficient operations of separation, collection, and water accumulation.

Advantageously, the water separation group is a separate module, mountable to the filtration group in case of need.

Advantageously, the water separation group and the filtration group are mutually arranged in series with respect to one another in the vehicle fuel circulation circuit.

Advantageously, the water separation group is associable with a horizontal filtration group, in such a way to add such a function related to the fuel-water separation to filtration groups otherwise not adapted to perform such operations.

Advantageously, the water separation group does not require a water collection chamber with a vertical extension or which extends in a lower position with respect to the filtration group. In fact, advantageously the water separation group is positionable in the assembly casing.

Advantageously, the water separation group extends laterally with respect to the longitudinal axis L-L, correspondingly allowing the increase of both the water accumulation capacity and of the capacity of filtration and accumulation of solid particulate by acting on the filtration chamber section and thus increasing the size and/or the number of filtration inserts positioned in the filtration chamber and thus the filtering surface available.

Advantageously, the water separation group is a cartridge insertable and removable in an extremely smooth manner into/from the casing.

It is clear that a person skilled in the art, in order to meet incidental needs, could make modifications to the water separation group or to the filtration and separation assembly, all of which fall within the scope of protection as defined in the following claims.

LIST OF REFERENCE NUMERALS 1 water separation group
2 separation device
20 bearing structure
200 passage opening
200' passage sub-opening
21 separation surface
21' upper separation surface
21" lower separation surface
3 blocking device
31 blocking surface
32 drainage channel
320 passage openings
36 fuel inlet channel
10 main body
11 head opening
12 bottom wall
100 separation chamber
100' upper region
100" lower region
900 fuel filtration and separation assembly
950 assembly casing
951 inlet wall
9510 inlet mouth
952 outlet wall
9520 outlet mouth
955 side walls
950' assembly housing
980 water level sensor
990 purge plug
500 filtration group
550 filtration insert
D partition wall
D0 through hole
D1 protective shield
L-L longitudinal axis
X-X main axis

The invention claimed is:

1. A water separation group for a fuel filtration and separation assembly of a fuel circulation system of a vehicle, wherein the assembly comprises:
   i) an assembly casing which extends along a longitudinal axis positionable in the vehicle in a horizontal position, fluidically connected with the fuel circulation system, comprising an inlet wall comprising at least one inlet mouth and an outlet wall comprising at least one outlet mouth;
   ii) a filtration group for filtering dirty fuel from suspended solid particles and impurities, housed in said assembly casing in fluidic connection with the inlet mouth;
   wherein the water separation group is positionable inside the assembly casing in fluidic connection with the filtration group and with the outlet mouth and extends along a main axis so that in a configuration wherein the separation group is mounted in the assembly casing, the main axis and the longitudinal axis are parallel and/or coincident;
   wherein the water separation group defines a water separation chamber within the assembly casing proximate the filtration group and horizontally aligned with the filtration group, comprising:
      a separator housed in the separation chamber fluidically connectable with the outlet mouth extending in longitudinal direction starting from said outlet wall and comprising a hollow supporting structure, with a clean side fluidically connected with the outlet mouth, said supporting structure comprising at least one passage opening through which the fuel flows, wherein the separator comprises a separation surface with a hydrophobic filter arranged transversely to the passage opening;
      a blocking device positioned below the separator dividing the separation chamber into an upper region wherein the separator is housed, and a lower region, wherein the water separated from the fuel is collected, the upper region and the lower region being longitudinally aligned with the filtration group, wherein the blocking device is adapted to prevent return of water in the upper region comprising a blocking surface extending in a longitudinal direction forming an oblique angle with the direction of the main axis which inclines at least a portion of said blocking surface to allow the water separated from the fuel to flow towards said outlet wall.

2. Water separation group according to claim 1, wherein the blocking device comprises at least one drainage channel extending in a longitudinal direction forming an opposite angle with respect to the angle formed by the blocking surface, so that the water separated by the separator flows from the upper region to the lower region in a double slide direction.

3. Water separation group according to claim 2, wherein the blocking device comprises two drainage channels arranged at side edges of the blocking surface.

4. Water separation group according to claim 3, wherein the blocking device comprises at least one passage opening adapted to put the upper region and the lower region in fluidic communication, wherein said passage opening is formed at the side edges of the blocking surface.

5. Water separation group according to claim 1, wherein the separator has a development in a longitudinal direction with respect to the vertical direction, and the supporting structure comprises a plurality of passage openings on which a plurality of separation surfaces are present, wherein the separation surfaces are arranged with respect to the direction of the main axis inclined to converge moving away from the outlet wall.

6. Water separation group according to claim 5, wherein the separator comprises an upper separation surface and a lower separation surface, the lower separation surface facing towards the blocking surface.

7. Water separation group according to claim 5, wherein the blocking surface is inclined, forming an angle with the direction of the main axis equal to the inclined angle according to which the separation surfaces extend, so that the blocking surface is parallel to the lower separation surface.

8. Water separation group according to claim 1, wherein the separator has a development in a longitudinal direction with respect to the vertical direction, and the supporting structure comprises a passage opening on which a separation surface is present, wherein the separation surface is arranged orthogonally to the direction of the main axis.

9. Water separation group according to claim 1, wherein the supporting structure is covered with a hydrophobic mesh, identifying at each passage opening a respective separation surface.

10. Water separation group according to claim 1, further comprising a main body which extends along the main axis and delimits therein the separation chamber comprising a bottom wall fluidically connected with the outlet wall and the at least one outlet mouth, wherein the main body supports the separator and the blocking device operatively connected with said bottom wall.

11. Water separation group according to claim 10, wherein the main body has, axially opposite the bottom wall, an opening through which the filtered fuel flows.

12. Fuel filtration and separation assembly of a fuel circulation system of a vehicle, comprising:
   i) an assembly casing which extends along a longitudinal axis positionable in the vehicle in a horizontal position, fluidically connected, the fuel circulation system comprising an inlet wall comprising at least one inlet mouth and an outlet wall comprising at least one outlet mouth;
   ii) a filtration group for filtering the dirty fuel from suspended solid particles and impurities, housed in said assembly casing in fluidic connection with the inlet mouth;
   iii) a water separation group, for separating the water from the filtered fuel, housed in said assembly casing in fluidic connection with the outlet mouth, according to claim 1.

13. Fuel filtration and separation assembly, according to claim 12, wherein the filtration group comprises at least one tubular filtration insert which extends longitudinally, defining a filtration chamber.

14. Fuel filtration and separation assembly, according to claim 12, wherein the filtration group and the separation group are mutually separated by a partition wall comprised in the filtration group, or in the separation group, or in the casing, having perpendicular extension with respect to the longitudinal axis dividing the filtration chamber from the separation chamber.

15. Fuel filtration and separation assembly, according to claim 12, wherein the assembly casing has an elongated shape between the inlet wall and the outlet wall, constant, having side walls parallel to the longitudinal axis.

16. Fuel filtration and separation assembly according to claim 12, further comprising a fuel heating group associable with the fuel filtration group with a longitudinal mutual engagement, at the opposite end thereof with respect to which the water separation group is arranged.

17. Method of assembling a fuel filtration and separation assembly according to claim 12, comprising the steps of:
- having an assembly housing which extends along the longitudinal axis comprising side walls and an outlet wall having an outlet mouth;
- inserting the separation group in the assembly housing so as to fluidically connect the separation group with the outlet mouth;
- inserting the filtration group longitudinally in the assembly housing with the separation group and the filtration group longitudinally aligned;
- the assembly casing closing the assembly housing with the inlet wall to fluidically connect the filtration group with the inlet mouth.

* * * * *